United States Patent [19]

Turos

[11] 4,346,121

[45] Aug. 24, 1982

[54] PROCESS FOR PREPARING CRUMB PRODUCTS

[76] Inventor: Sandor Turos, Gamla Särövägen 113, S-436 00 Askim, Sweden

[21] Appl. No.: 227,882

[22] PCT Filed: Mar. 17, 1980

[86] PCT No.: PCT/SE80/00081

§ 371 Date: Nov. 3, 1980

§ 102(e) Date: Nov. 3, 1980

[87] PCT Pub. No.: WO80/01869

PCT Pub. Date: Sep. 18, 1980

[30] Foreign Application Priority Data

Mar. 16, 1979 [SE] Sweden .................. 7902399

[51] Int. Cl.³ .................................. A23G 1/00
[52] U.S. Cl. .................. 426/580; 426/583; 426/585; 426/586; 426/587; 426/602; 426/613; 426/471
[58] Field of Search ............ 426/580, 583–587, 426/602, 613, 631, 660, 533, 471, 443

[56] References Cited

U.S. PATENT DOCUMENTS

| | | | |
|---|---|---|---|
| 2,835,593 | 5/1958 | Rusoff | 426/35 |
| 3,622,342 | 11/1971 | Rusoff | 426/658 |
| 3,900,578 | 8/1975 | Turos | 426/580 |
| 4,084,011 | 4/1978 | Chevalley | 426/580 |

FOREIGN PATENT DOCUMENTS 1306356 2/1973 United Kingdom ............ 426/580

*Primary Examiner*—Jeanette M. Hunter
*Attorney, Agent, or Firm*—Abelman, Frayne & Rezac

[57] ABSTRACT

A process for the manufacturing of crumb products by preparing a first raw material flow F1 containing components or part flows f1–f4, of which f1 contains liquid milk or milk products at a dry solids content of 2–70% by weight, f2 contains sugar raw materials in the form of tetroses, pentoses, hexoses, sugar alcohols, disaccharides, partially hydrolyzed starch, syrup products, or different combinations thereof, f3 contains dry protein raw materials at the same dry solids contents as stated for f1, f4 contains one or more amino acids and a second flow F2 consisting of part flows f5 and optionally f6, of which f5 contains fatty components and f6 consists of an emulsifier for the fat phase and that the flow f1 at a dry solids content of 20–70% by weight and a pH in the range of 4–8, preferably 6.5–7.5, is heat treated at a temperature of 100°–130° C. during a period of time of about 7–2 minutes for performing a Maillard reaction, and subsequently is cooled to a temperature of suitably 80°–95° C.; whereupon the flow f1 at the said temperature and f2 at a temperature of 65°–75° C. are metered into an emulsifying vessel for the formation of an emulsion of f2 in f1, which emulsion is submitted to a homogenizing treatment, whereupon the crumb emulsion formed is either used directly or dried to the formation of a powder which can be submitted to a further heat-treatment for a completing Maillard reaction, further drying and sieving.

12 Claims, 3 Drawing Figures

Fig. 1

Flow diagram for crumb preparation

Fig. 3

PROCESS FOR PREPARING CRUMB PRODUCTS

TECHNICAL FIELD

The present invention relates to an improved process for the preparation of crumb products. So-called "crumb" is generally used as a raw material in the manufacturing of milk chocolate and other chocolate products.

PRIOR ART

The crumb usually contains all components of the chocolate except the cocoa powder and cocoa fat. Further information regarding crumb is given in the Swedish patent application No. 7210811-1 which is incorporated herewith as a reference.

The present invention relates to a development of previously known processes for the preparation of crumb and the products obtained according to the invention have, compared with previously known products, improved taste, consistency and appearance.

THE INVENTION

The product of the invention, viz. crumb for chocolate manufacturing and similar purposes, is prepared according to a process which comprises preparing of a first flow containing the essential components of the crumb except the fatty part, which is submitted to a heat-treatment, whereupon the so-treated first flow with the aid of a metering device is admixed with a second flow consisting of the fatty phase. The mixture of crumb components so obtained, i.e. the crumb slurry, is submitted to a homogenization, whereupon the homogenized slurry is dried in a manner known per se, and subsequently the dried product is heat-treated, dried and cooled and preferably separated into fractions of product material with the desired particle size, fine components ("fines") and coarser components ("oversize").

All steps in the process are performed with the use of commerically available apparatus.

The process according to the invention enables the preparation of crumb products for different uses and depending of the intended use for the product different types of natural and synthetic foodstuff raw materials are used in the process.

As is well-known from the prior art different types of milk products, fatty raw materials, sugar raw materials and protein materials are used as raw materials for the crumb preparation.

As the milk raw material one may use whole milk, partly or completely defatted milk, whey, completely or partly desalted whey, butter milk, casein or caseinate with different protein contents, whey protein concentrates and different combinations of the above-defined products.

The content of fat, protein and milk sugar can be varied in view of the desired end product. Lactose present in the milk products can be completely or partly hydrolyzed, e.g. enzymatically, so that lactose is transferred to corresponding amounts of glucose and galactose since the presence of these sugars is advantageous for the desired Maillard reaction.

The fatty raw material used in the products according to the invention can be milk fat such as in the form of cream, butter oil or butter, vegetable or animal fats, meals of different fat-rich vegetables such as natural or completely or partly defatted soya meal, peanut meal, rape seed meal, etc., cocoa butter and so-called cocoa mass.

As the sugar raw material in the products according to the invention one may use many different sugar products such as tetroses, pentoses, hexoses, sugar alcohols, disaccharides, dextromaltoses, partially hydrolyzed starch with a suitable DE value, Lykasin ®, wheat syrup, starch syrup, xylitol and different combinations of the materials enumerated above.

The products according to the invention also contain protein materials, such as in the form of natural or completely or partly defatted soya meal, soya concentrate, soya isolates, natural or completely or partly defatted meal of nuts and beans, yeast and yeast concentrates, protein from green herbs, rape protein and similar. Usually and preferably additives of different amino acids are used.

By a suitable choice of raw materials according to the enumeration above it is possible to vary the taste, the appearance and the usability of the crumb as desired. For conventional milk chocolate the crumb should thus be composed of whole milk or defatted milk, cream or butter and sugar. For the preparation of milk chocolate the milk crumb prepared is admixed with cocoa mass, cocoa butter and further sugar and the mixture is then processed to milk chocolate in a manner known per se.

When the crumb is intended to be used for chocolate products such as "couverture" of when it is desired to completely or partly replace the cocoa raw material therein the crumb is suitably prepared from whey, desalted whey, defatted or whole soya meal, a suitable vegetable fat and sugar. The product so obtained is, as a matter of fact, a cocoa substitute and the couverture is manufactured by mixing 15–30% of the product with 0–10% of cocoa powder, 20–40% of a suitable vegetable fat, sugar and aroma substances, calculated on the weight.

Chocolate crumb is a product which is manufactured with the use of a suitably composed mixture of the above-mentioned raw materials, which mixture is submitted to a Maillard reaction, viz. a carbonyl/amino reaction. This well-known chemical reaction gives the mixture a taste and colour which is desired for confectionary products. The storage properties of the product are also considerably improved. It is well-known that the reaction products of the Maillard reaction in fats and fat-containing products act as a completely innocuous natural anti-oxidation agent. The amino groups present in proteins and amino acids take part in the Maillard reaction by reacting with the present reducing sugars. The intensity of the reaction and the taste and colour of the end product is greatly advanced by the presence in the liquid crumb slurry of free amino acids such as lysin, valin, glutamic acid, alanin, phenyl alanin, etc. The so-called highly reactive sugars such as dextrose, glucose and fructose are also very important for the formation of different aroma substances and colouring substances. Other reaction parameters in the Maillard reaction is the dry solids content of the slurry, its pH, the reaction/drying temperature.

EXPLANATION OF THE INVENTION WITH REFERENCE TO THE DRAWINGS

The invention is elucidated in detail below with reference to the enclosed drawings, wherein.

Figure 1:
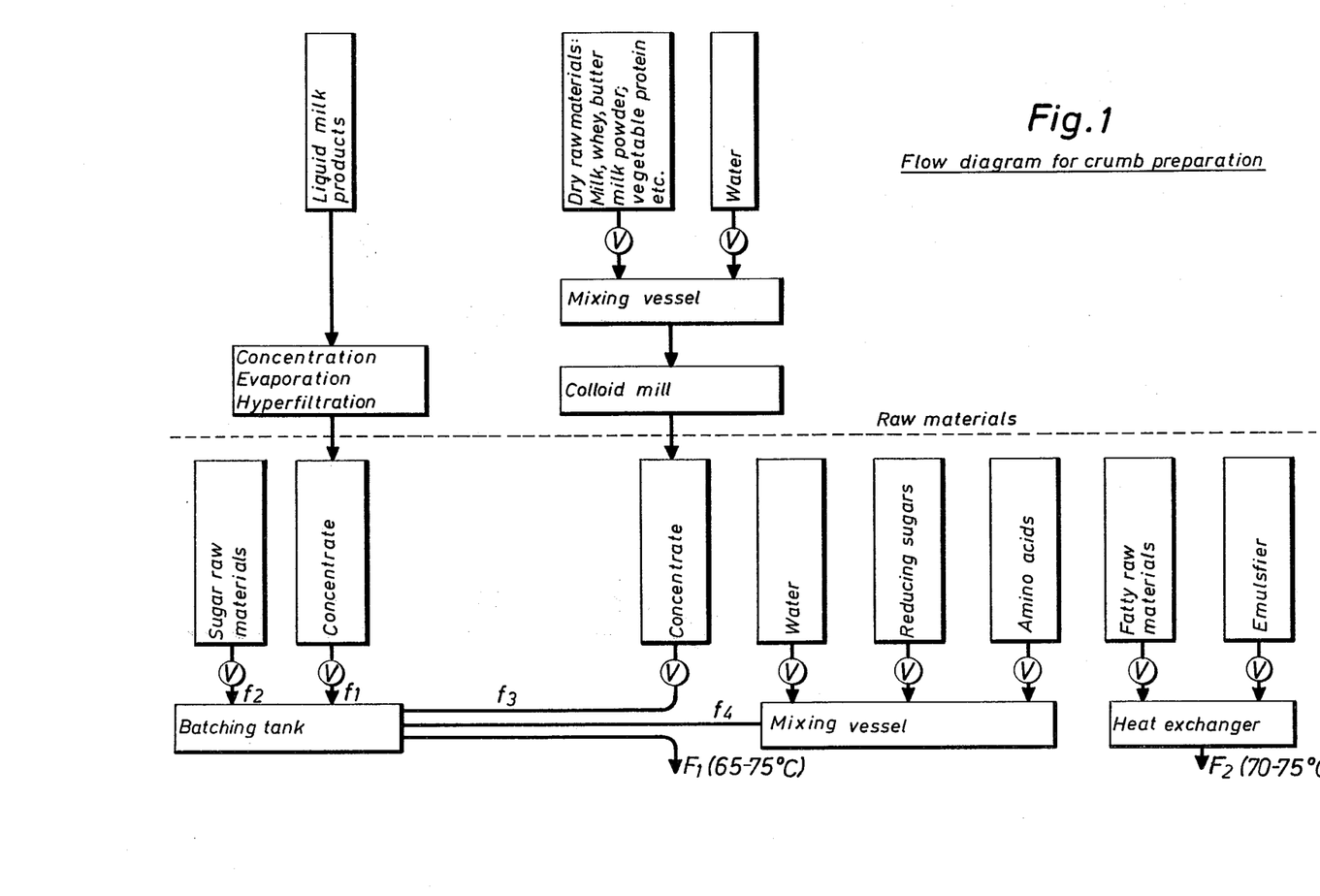
FIG. 1 is a flow diagram for the process according to the invention for the preparation of crumb.

As indicated in the flow diagram according to FIG. 1 partial flows f1-f4 are first prepared, which are combined to a common flow F1. A second flow F2 is formed from the fatty raw materials and an optional emulsifying agent.

The flow f1 consists of fresh milk which is submitted to concentration by evaporation and optionally hyperfiltration. The flow f2 consists of an aqueous solution of the sugar raw materials. The flow f3 consists of dry raw materials such as dry milk, whey powder, butter milk powder, vegetable protein and similar which are dissolved in water in a mixing vessel and submitted to a treatment in a colloid mill. The flow f4 consists of an aqueous solution of reducing sugars and amino acids.

Figure 2:
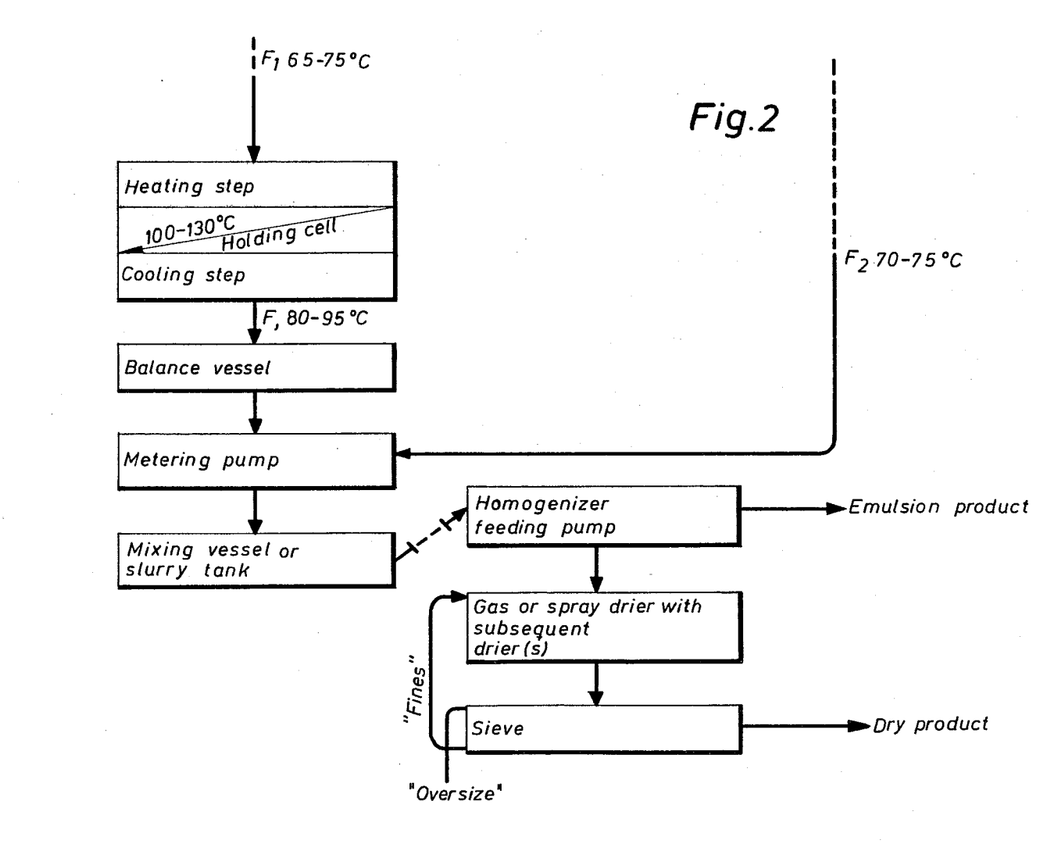
FIG. 2 is a continuation of the flow diagram according to FIG. 1 (FIGS. 1 and 2 elucidate the preferred process)

As can be seen in FIG. 2 flow F1 is introduced at a temperature of 65°-75° C. in a heating step and transferred to a holding cell at a temperature of 100°-130° C. and subsequently to a cooling step where the temperature is decreased to 80°-95° C. and transported to a balance vessel, viz. a storage vessel from which it is fed by a metering pump which suitably is common for flows F1 and F2, to a mixing vessel or a slurry tank and therefrom to a homogenizer which optionally also can function as a metering pump for transport of the slurry to a spray drier or a similar device. The powder obtained from the spray drier is fed to a heat-treating sieve device from which the product is obtained, the fine components ("fines") being recircled to the spray drier and coarser material is submitted to grinding and further sieving.

Figure 3:
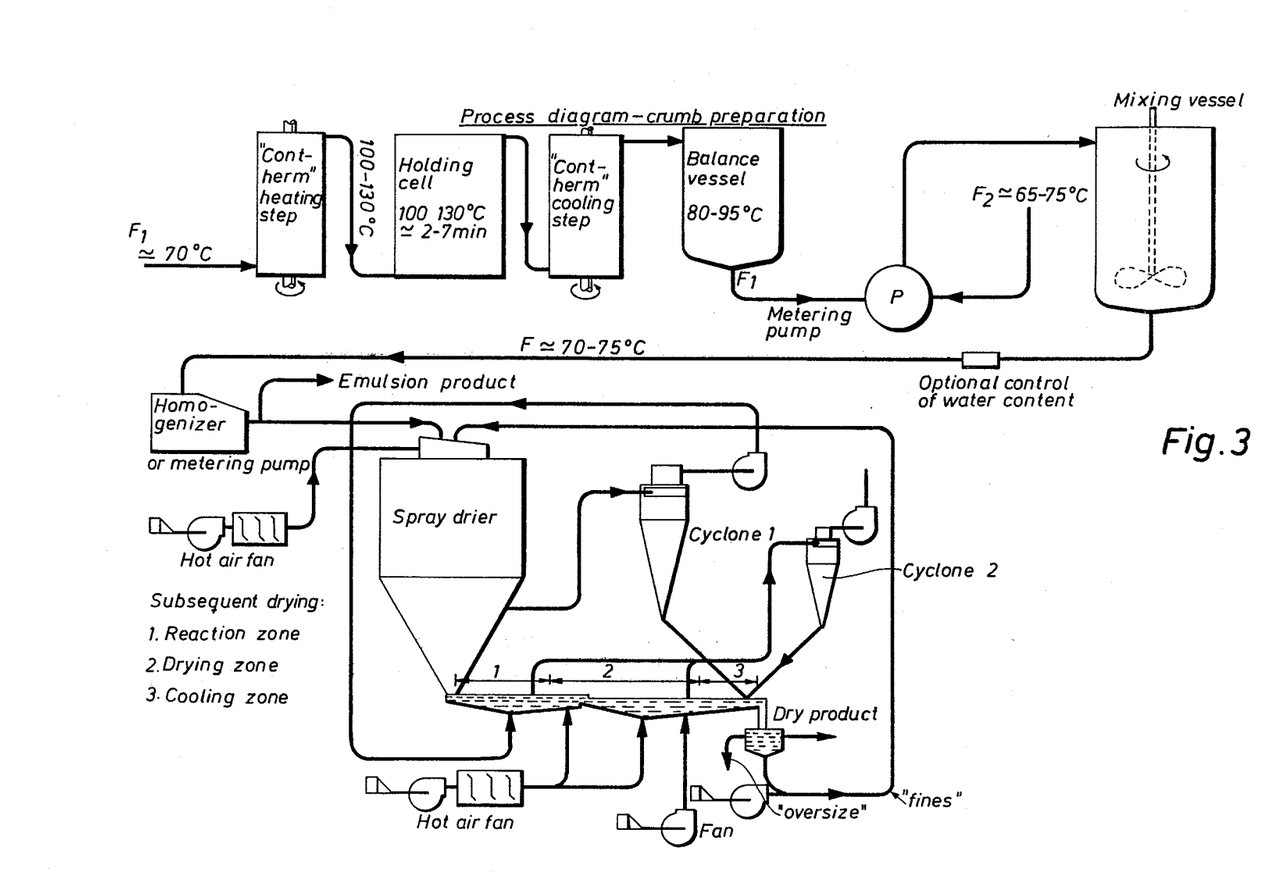
FIG. 3 is a process diagram for preparation of crumb according to the invention.

FIG. 3 shows diagramatically an apparatus used for performing the process according to the invention, essentially as has been indicated in FIGS. 1 and 2. The finished flow F1 is thus at a temperature of about 70° C. fed to a heat-treatment step and at a temperature of 100°-130° C. transferred to a storage container or holding cell, wherein the flow is kept at a temperature of 100°-130° C. for a period of 7-2 minutes, whereupon the product is transferred to a cooling step and therefrom to a balance vessel at a temperature of 80°-95° C. From the balance vessel the flow F1 is fed with the metering pump parallelly with the flow F2 in desired proportions to a mixing vessel where the both flows F1 and F2 are admixed and, after an optional control of the water content, fed to a homogenizer or metering pump which feeds the slurry under pressure to a conventional spray drier, preferably provided with a spreader disc and a so-called air knife. The powder obtained from the spray drier is submitted to drying and heat-treatment in a flowing bed which in the horizontal direction is subdivided in a reaction zone and a subsequent drying zone and finally a cooling zone. After the cooling zone the product is submitted to a sieving for subdivision of the product in fine components ("fines") and coarser particles. The fines are preferably recircled to the spray drier, whereas the coarser particles are further ground and sieved. The fines are recircled as indicated above.

The process according to the invention consists of different steps, viz. manufacturing of a crumb slurry; partial or complete Maillard reaction, suitably in a heat-exchanger; drying and a finishing Maillard reaction; and sieving.

THE PREPARATION OF THE CRUMB SLURRY

The raw materials selected for the product type to be prepared, e.g. fresh milk for milk chocolate crum, are concentrated by treatment in a three or multi-step evaporator or a combination of a hyperfilter and an evaporator to a dry solids content of 20-70% by weight, suitably 30-45% by weight. The concentrate from the evaporator is at a temperature of about 55° C. fed through a plate heat-exchanger of a suitable size and the temperature is therein increased to 70°-75° C. The hot concentrate from the heat-exchanger is then fed to a jacketed vessel of a suitable size, which is provided with an effective stirrer and apparatus for pH-control which governs a metering pump for addition of a suitable amount of diluted sodium hydroxide or acid (lactic acid) for adjustment of the pH of the slurry within the range 4-8, suitably 6.5-7.5. In this vessel the remaining required raw materials are added, such as cane sugar or beet sugar which by effective stirring are dissolved in the hot concentrate. The sugar content can be up to 70-75% by weight, calculated on the finished dry product, suitably 15-35% by weight. At this stage suitably one or several of the reactive amino acids are added. The content of the added amino acids can be up to 4% by weight, suitably 0.05-0.5% by weight. Also at this stage some or several of the reducing sugars should be added. The content thereof can be up to 20% by weight, suitably 5-7% by weight, calculated on the finished product.

PARTIAL OR COMPLETE MAILLARD REACTION IN THE HEAT-EXCHANGER

The concentrate from the batching tanc is fed at a temperature of about 70° C. to a heat-exchanger, e.g. a plate heat-exchanger (ex Alfa-Laval, Sweden) or of the type "Contherm" the temperature being increased up to 130° C., suitably 105°-115° C. The heat-exchanger is suitably connected to a so-called holding cell for keeping the slurry at the high temperature during a period of time up to about 10 minutes, suitably 5-6 minutes. Directly connected to the holding cell is a second heat-exchanger for cooling of the product to a temperature of about 65°-95° C., suitably 75°-86° C. When defatted milk is used for the slurry manufacturing, which is suitable for durability reasons, the crumb slurry which at this stage is yellow-brown is combined with the aid of a metering pump with a suitable amount of the chosen fatty raw material, e.g. cream with a fat content of 12-35%, butter oil or some other animal or vegetable fat. The fat content of the slurry can be about 50-55%, suitably 15-30%, calculated on the finished product. When cream is not used as the fatty raw material a suitable emulsifier should be used so as to obtain an emulsion of the fat. The amount of emulsifier, e.g. glycerol monostearate or similar, can be up to 10% by weight, suitably 1-5% by weight, calculated on the fat. The slurry from the metering pump is fed at a temperature of about 70° C. to a mixing vessel and further to a homogenizer, suitably a two-step pressure homogenizer. The pressure in the homogenizer should be 180-190 kp/cm$^2$ subdivided in 120 kp/cm$^2$ in the first step and 60 kp/cm$^2$ in the second homogenizing step. After the homogenization of the crumb slurry it is finished for drying in some type of gas drier which suitably is connected to a fluidized drying and cooling bed. For the drying it is suitable to use a spray drier of the "Niro" type provided with a spreader disc and a so-called air knife and further the spray drier should be directly connected to a vibrating fluidized bed, suitably comprising several steps. The fluidized bed is of importance for the finishing of the Maillard reaction and for the final drying of the product to a moisture content which is suitable from the usage point of view, suitably 1.5–6% by weight, suitably 2–3.5% by weight. The use of the vibrating fluidized bed is also of advantage from a manufacturing/economical point of view. It is thus well-known that in spray drying the removal of the last amounts of moisture requires the greatest amount of energy. Due to the fact that the heat transfer between the product particles and the drying medium in a vibrating fluidized bed is more effective than in the spary drier only a fraction of the energy amount which would be required in a spary drier is consumed.

DRYING AND FINISHING OF THE MAILLARD REACTION

The drying of the slurry prepared as indicated above can be made in different manners and with the aid of different types of apparatus and driers. The drying can be performed stationary or continuously. Stationary drying is performed with the aid of different types of stationary fluidized beds, e.g. a bed of the so-called anhydro type, but such are usually somewhat more expensive in use than apparatus for continuous drying such as the common spray driers.

A spray drying process can in principle be performed in two somewhat different ways, viz.:

(a) drying without agglomeration and separation of "fines" and recircling the same. This process is well-known and suggested parameters which can vary to some extent depending on the composition of the crumb slurry, are about as follows:

Alternative (1) when the drier is connected to some type of subsequent drier such as a vibrating fluidized bed, the water content of the product emanating from the spray drier is adjusted to 6–10% by weight, suitably 7–8% by weight. It is desirable to maintain this value which then will govern the other process parameters such as the temperatures of the in-going and out-going drying medium and the rpm of the spreader disc. A common temperature for the in-going drying medium in this type of drying is 170°–200° C. and the temperature of the out-going medium is 80°–95° C. This means that the temperature difference should be about 95°–110° C. The commonly used speed for the spreader disc is suitably 13,000–16,000 rpm. This type of drying is advantageous especially due to the fact that the capacity of the spray drier is used to an economical advantage and due to the fact that the above-mentioned water content of 7–8% by weight is advantageous since the Maillard reaction then can be finished with a very great intensity in the subsequent drying. It is thus well-known that the reaction velocity in the Maillard reaction has its maximum value at about the said water contents. The drying in the subsequent drier should be performed in such a manner that the product can be maintained at the optimal water content for 5–10 minutes, whereupon it is dried to a final moisture content of 2–5% by weight, usually 2.5–3.5% by weight.

Alternative (2) This alternative comprises drying without any possibility to a subsequent drying. Such a drying can be performed in the apparatus mentioned above but the process will be less advantageous both from the product quality point of view and from the economical point of view, for instance due to the fact that the Maillard reaction almost completely has to be performed when the crumb slurry is in the heat-exchanger, which means that the possibility to be subsequent reaction is very small or non-existent. Further, in this type of drying it is of disadvantage that the temperature difference between the in-going and out-going drying medium is considerably lesser which will cause a considerably lessened capacity than would be the case if the apparatus were provided with a subsequent drier.

(b) Spray drying via so-called "straight-through" agglomeration.

This process comprises separation of fines and recirculation of the same to the spray drier in the wet zone. The recircled fines have a very great importance for the agglomeration. The fine particles partly function as agglomeration centra for the finely divided slurry particles which adhere to the surface of the particles and this process is repeated until a desired particle size and particle structure has been obtained. The drying parameters are also different in relation to those according to the above-mentioned process, viz. drying without recirculation of fines. In general the temperature of the in-going drying medium is about 10°–20° C. lower and simultaneously the outgoing temperature is likewise 10°–20° C. lower than the temperature in drying without separation of fines and agglomeration. This means that the temperature difference between the in-going and the out-going temperatures for the drying medium is of about the same magnitude as in the first drying process. The rpm for the spreader disc is considerably lower, viz. about 10,000–11,000 rpm as compared to 13,000–16,000 rpm for drying without agglomeration. The product obtained with agglomeration has considerable advantages both from a production point of view and from a user point of view. Thus, the product forms a more porous product layer on the vibrating fluidized bed which enables a more easy and effective final drying. It is easier to mix the crumb so prepared with the other components in the manufacturing of chocolate or other products. Also, this is achieved without any problems due to dusting or loss of products. It should be noted that this type of drying always presupposes that the spray drier is directly connected to at least one effective subsequent drier.

In practice the process according to the invention is suitably performed in an apparatus which is elucidated in the flow diagrams in FIGS. 1 and 2. As can be seen a flow f1 is prepared by concentration of liquid fresh milk raw materials which through a volumeter is fed into a batching tank or slurry preparation tank. Into this tank also the other components are fed, viz. the sugar raw materials (f2) which are weighed and dissolved by effective stirring in the hot concentrate. Dry raw materials, viz. vegetable protein, dry milk solids, whey powder or butter milk powder are at first suitably admixed with a minor amount of water and fed through a colloid mill as the flow f3 into the slurry tank. The flow f3 can partly or completely replace the flow f1. When a more intensive Maillard reaction is desired, viz. a more intensive browning and a more significant change of taste than can be achieved with the reactive components naturally present in the concentrate, viz. lactose and the different proteins in milk and vegetable products, it is suitable to add a chosen species and amount of amino acid and reducing sugar dissolved in water as the flow f4. If, for economical reasons, it is desired to save the greatest amount possible of natural cocoa raw material and replace this with a cheaper crumb product a more heavy browning reaction is advantageous and in such case it is suitable to add up to 0.5% by weight of lysin and up to 10% by weight of dextrose.

When it is desired to achieve a special rounded taste by the Maillard reaction—except the characteristic toffee taste—another amino acid is chosen, e.g. up to 0.5% by weight of valin which gives a cocoa taste, or up to 0.2% by weight of phenyl alanin, which gives a certain fruity taste, and of course glucose or dextrose in the amount indicated above.

The slurry consisting of the different part flows has suitably a dry solids content of 40-85% by weight and it can be submitted to a partial or a complete Maillard reaction at an increased temperature such as in a plate heat-exchanger or a "scraped surface" heat-exchanger (e.g. of the type "Contherm"). In the heat-exchanger the slurry is heated from 65°-75° C. to 100°-130° C. and with the use of a holding cell the increased slurry temperature shall be maintained for 5-15 minutes. It should be noted that the reaction temperature as well as the reaction time shall be chosen and adjusted in relation to the desired intensity for the Maillard reaction. It is important to note that the same reaction intensity can be achieved at a considerably lower temperature and during a shorter reaction time when the slurry contains the part flow f4. After being kept in the holding cell the hot crumb slurry must be cooled in a directly connected heat-exchanger to a temperature of 80°-95° C. and fed into a jacketed intermediary storage tank or mixer provided with an effective stirrer and of a suitable size. In relation to the desired product properties the composition as well as the part steps before the drying can be varied to a certain extent, such as the emulsion formation. When a low-fat crumb is to be prepared the crumb slurry is thus finished after the adjustment of the dry solids content at a value between 40 and 60% by weight. Fat crumb can either be made from cream or with the use of a water-free animal or vegetable fat. When fat crumb is to be manufactured from cream the flow F1 of the crumb slurry at a temperature of 80°-90° C. is admixed with the aid of a metering pump with a suitable amount of cream such as so-called coffee cream when the dry solids content of the slurry is as high as 75-85% by weight and with cream with a higher fat content, so-called whipping cream, when the dry solids content of the slurry is lower. The cream then forms the flow F2 and its temperature should be about 65° C. In the mixer flows F1 and F2 are admixed to the formation of a homogeneous product in the form of an emulsion of the type oil-in-water which is ready to feed to the drier. Fat crumb can also be manufactured with the use of a flow F2 which consists of a water-free or almost water-free animal or vegetable fat, e.g. butter, butter oil or a vegetable fat. In this case the flow must after the mixing vessel be submitted to an effective homogenization with the use of a suitable homogenizer such as an ultrasonic or pressure homogenizer. After homogenization the slurry is ready for drying.

Fat crumb can also be made with the use of a flow F2 containing a dry fatty meal such as soya meal. In this case the flow F1 is admixed with a required amount of a dry flow of F2. In the mixing vessel the flow F2 is admixed with the flow F1 by stirring to the formation of a homogeneous consistency. In this case it is suitable to grind the flow in a colloid mill before it is fed to the drier. It is obvious that in all instances the dry solids content of the finished slurry should be adjusted as indicated by addition of hot water to an optimal value from the drying point of view.

The drying of a crumb slurry prepared as described above is performed in a spray drier, optionally in combination with a fluidized bed drier as described above.

The process according to the invention has been described in relation to the preparation of a dry product, viz. conventional crumb of the type which is conventionally used for the preparation of milk chocolate. However, the process according to the invention can be used for the preparation a "crumb" of the emulsion type, viz. an end product with a pasty or syrupy consistence. In that case the Maillard reaction must be finished in the holding cell, viz. during the first heat-treatment of the product at a temperature of 100°-130° C.

The dry crumb product prepared according to the invention is conventionally used for the preparation of chocolate, nougat and other conventional confectionary types. For manufacturing of chocolate with the use of crumb according to the invention the crumb is admixed with other required amounts of sugar, suitably so-called powder sugar, and fat with suitable melting properties. The dry product according to the invention can further be used for the preparation of cola and chocolate drinks of the instant type and for the manufacturing of creams and similar for filled chocolates. The pasty or syrupy product can also be used for the manufacturing of toffee and finished drinks of the cola and chocolate types.

Toffee is usually manufactured in batches and the components such as fat-free or fat condensed milk, finely ground sugar, glucose and fat are admixed in a suitable mixer to a rather homogeneous suspension. From the mixing vessel the toffee slurry so prepared is transferred to a cooking vessel in which the heating is continued to a dry solids content of 93-94%. This very time-consuming and ineffective method has other great disadvantages such as for instance an uneven and very coarse distribution of the fat in the toffee mass which very much contributes to the stickiness and roughness of the toffee. The use of the crystalline conventional toffee slurry strongly delimits the possibility of using raw materials such as whey, desalted whey and similar without risk for obtaining an end product which is coarse and completely crystallized. Addition of whey dry solids to toffee would otherwise be advantageous from a nutritional point of view and also for taste and economical reasons. There is thus a great commercial interest in achieving a suitable, flexible, free-flowing, complete toffee emulsion which enables a more rational manufacturing of an improved toffee product in a considerably simpler continuous process. The above-mentioned product according to the invention—the toffee emulsion—gives considerable advantages in the product and also in the process for the manufacturing of toffee and similar confectionary products due to the fact that the product is a completely homogenized emulsion containing all the required components except the optional flavouring and colouring additives such as liquorice paste which are required for the manufacturing of toffee. A toffee product prepared on the basis of the toffee emulsion according to the invention has a considerably more advantageous consistence and a more agreeable taste. Dry milk solids and sugar can in the toffee emulsion according to the invention completely or partly be replaced with whey dry solids without any risk for lactose crystallization. Depending on the mode and field of the use different types of natural foodstuff raw materials and foodstuff products be used as a raw material for its manufacture. The raw materials used are essentially the same as indicated above in connection with the dry crumb product and the choice of the components of the emulsion decides the nature and the use of the product. For the preparation of conventional cream toffee the emulsion should thus preferably be prepared from full milk or skimmed milk, cream or butter, sugar, glucose and vegetable fat such as rape fat or peanut fat. With the right choice of proportions between the different components the toffee emulsion will undergo the above-described Maillard reaction upon boiling or heat-treatment.

The toffee slurry is prepared in the same manner as described above, viz. fresh milk raw materials such as skimmed milk, whole milk, whey (each per se or in admixture) are concentrated in a three or multi-step evaporator or in a combination of an evaporator and a hyperfilter to a dry solids content of 20–70% by weight, suitably 30–35% by weight. The concentrate in the evaporator which usually has a temperature of about 35° C. is heated in the above-described heat-exchanger to a temperature of 70°–75° C. The hot concentrate is fed into a directly connected jacketed slurry tank of a suitable size. In another vessel provided with a stirrer or in a so-called solvomate the required amount of sugar is dissolved, suitably partially refined sugar, in water at 90°–95° C. to a dry solids content of 40–80% by weight, suitably 70–80% by weight. Starch syrup (glucose) is then added and the highly reactive components, i.e. free amino acids dissolved in warm water at about 50° C. are added to the solution. The content of the added amino acids can be up to about 4% by weight and is suitably about 0.5% by weight. The thick and as regards the sugar content almost saturated solution is heated to a temperature of 75°–80° C. before it is fed into the slurry tank. The fat is warmed in any suitable manner to a temperature of 70° C. whereupon the emulsifying agent, e.g. glycerol monostearate, is dissolved therein. The required amount of emulsifier which is calculated on the amount of the fat used, can vary to a certain extent depending on the type and protein content of the milk raw material. If for instance the aqueous phase contains milk dry solids a lesser amount of emulsifier is required than when it contains whey. The amount of the emulsifier must, however, be sufficient to make the finished emulsion stable and with the oil phase in the aqueous phase. The required amount of emulsifier is usually between 1 and 5% by weight, calculated on the fat. The fat content of the slurry can be up to 30–40%, suitably 20–25% by weight. The warm fat-free concentrate is admixed with the warm fat containing the emulsifier with the aid of a metering pump which simultaneously can be used as a feeding pump to the homogenizer.

The finished slurry is homogenized so as to obtain a product with a unitary consistence and particle size. The size of the fat particles after the homogenization should be below about 5 $\mu$m. Immediately after the homogenization step the emulsion should be rapidly cooled, suitably in a heat-exchanger of the "scraped surface type", to a temperature lower than 20° C. and suitably lower than 15° C. A rapid cooling is usually required so as to avoid a crystallization of lactose or saccharose. Such crystals are difficult to redissolve during subsequent product manufacturing and as a result thereof the toffee product may be coarse. In practice the process according to the invention is performed in a manner and in a device of the same type and composition as shown in the flow diagrams in FIGS. 1 and 2. As indicated the flow f1 is prepared by concentration of liquid fresh milk raw materials which through a volumeter is fed into a slurry preparation tank. Into this tank also the other components present in the continuous phase or aqueous phase are fed. Thus, refined sugar raw materials or suitably partially refined saccharose and glucose (starch syrup) are dissolved in a solvomate and fed as flow f2 into the slurry tank at a temperature of 75°–80° C. Depending on the intended product and its use it is suitable to add free amino acids in the concentration mentioned above. In this case they are suitably dissolved in water at about 50° C. and introduced into the slurry tank as the flow f3. Then the combined flows f1 plus f2 plus f3 are admixed by effective stirring and heating to 70°–75° C. before the hot flow of F2, i.e. the fat, is added. It is suitable to use vegetable or animal fat at a temperature of 70° C. in admixture with a suitable amount of a suitable emulsifier. The emulsifier and the fat thus form a clear melt at a temperature of about 70°–75° C. The both flows F2 and F1 are metered with the aid of a metering pump and fed into a directly connected homogenizer. After the homogenization the homogeneous emulsion formed (temperature about 65°–70° C.) wherein the fat is evenly dispersed in the form of fat particles with a size lesser than 5 $\mu$m, must be rapidly and effectively cooled. This is suitably made in a scraped surface heat-exchanger cooled with ice water. By the cooling the temperature of the emulsion should be lowered from the starting temperature 70° C. to about 10°–12° C. Depending on the composition of the emulsion and the homogenization process used it is in certain cases necessary to removed enclosed air from the emulsion before cooling. Removal of enclosed air can be made with the use of a conventional vacuum device.

The cold toffee emulsion is transferred directly in the cold condition to suitable transport vessels which suitably should be filled completely without any air left therein after closure.

The toffee emulsion prepared according to the invention can be used as such for the manufacturing of toffee and similar sweet products or enriched with different types of flavour additives before it is used for toffee manufacturing.

The invention is further elucidated with the following non-limiting examples.

EXAMPLE 1

In a three-step evaporator with a so-called final thickener 5,850 kgs skimmed milk (dry solids content 8.9%) were evaporated to a dry solids content of 52% by weight. This concentrate which weighed 1,000 kgs was used as the flow f1 (temperature about 55° C.) and fed into a jacketed slurry tank with the volume 2,000 liters and provided with an effective stirrer. 200 kgs of partially refined beet sugar was added as the flow f2 and 70 kgs of glucose (80%) but no amino acid was added as the flow f4. The first flow F1 thus consisted of f1+f2+f4=1,270 kgs with a dry solids content of 61.5%.

The slurry was heated during the batching with a heating medium consisting of water of 95° C. until a temperature of 70° C. was reached. After the preheating the concentrate was transferred to a heat-exchanger consisting of two verticle heat-exchangers of the scraped surface type (Alfa-Laval's Contherm type 6×2, hydraulically powered).

In the first heat-exchanger the temperature of the slurry was increased to 110° C. with the use of a suitable pressure. After the heating the slurry temperature was kept at 110° C. during 6 minutes in a holding cell before it was fed into a second heat-exchanger for cooling to 85° C. The yellow-brown crumb slurry, viz. the flow F1, was then admixed with the aid of a metering pump with a flow F2 consisting of 650 kgs of whipping cream preheated to a temperature of 65° C. The flow from the metering pump F, which consisted of F1+F2, was 1,885 kgs with a dry solids content of 53% and was fed into a jacketed mixer with the volume 2,500 liters. The finished flow was fed into a spray drier (type "Niro ®") with a capacity corresponding to 250 kgs water removal per hour. The product was spray dried without agglomeration to a dry solids content of 93%. From the spray drier the product was introduced into a directly connected vibrating fluidized bed for finishing the Maillard reaction and removal of further about 5% of water.

The product obtained was powderous and yellow-brown and tasted well and was extremely well suited for the preparation of milk chocolate and other confectionary products.

The product had the following composition:

|  | % by weight |
|---|---|
| Dry solids content | 97.9 |
| Protein | 18.2 |
| Fat | 20.1 |
| Ash content | 5.1 |
| Carbohydrates whereof | 56.6 |
| saccharose | 20 |
| glucose | 6 |
| lactose | 30.6 |

The product according to this example was used for the preparation of milk chocolate with the following composition: 38% milk crumb according to the example; 33% powdered sugar; 7% cocoa mass (neutral roasting); 7% cocoa butter. The components were mixed in a mixer (type "Zeta") to a homogeneous texture whereupon it was rolled in two steps to a particle size lesser than 15 μm and after addition of further 15% cocoa butter it was conched for 24 hours at 50°–55° C.

Nougat mass was manufactured from milk crumb according to the example from the following components: 23% milk crumb, 21% finely ground krokant (caramellized sugar), 10% powdered sugar, 15% roasted nut mass, 2.4% cocoa powder (10/12) and 0.3% salt. The components were mixed in a Zeta mixer. So as to make the mass rollable 12% of peanut butter with the melting point 32° C. were added. The mixed nougat mass was coarsely rolled and finely rolled on a common chocolate roller. The rolled mass was admixed with further 18% of peanut fat with the melting point 32° C. and 0.3% natural vanilla flavour. The nougat mass obtained was used for the manufacturing of sweets and nougat pieces in a conventional manner.

EXAMPLE 2

In a three-step evaporator 2,850 kgs of whey solution and 34,020 kgs of desalted whey solution were concentrated to a dry solids content of 32%. This concentrate which weighed 1,160 kgs was used at a temperature of 55° C. as the flow f1 and was fed into a mixing vessel with the volume 2,500 liters and provided with an effective stirrer (Ultra-Turrax, type Honke Kunkel KG, TP 115/4) and a jacket. The whey slurry was admixed with 350 kgs of debittered fat soya meal (fat content about 20%, protein content about 41%) as the flow f3. The mixture was effectively dispersed. The slurry was heated in the mixing vessel to 75° C., whereupon 220 kgs of sugar were added as the flow f2 and as the flow f4 70 kgs of glucose and 1 kg of lysin were added, both dissolved in 10 liters of water. The flow F1 thus consisted of f1+f2+f3+f4 corresponding to a weight of 1,676 kgs with a dry solids content of 59.7%. The finished flow F1 was fed in the Contherm apparatus mentioned in Example 1 and heated to 125° C. The holding time in this experiment was also 6 minutes, whereupon the concentrate was cooled to 85° C. At this temperature the slurry was thick and too viscous for spray drying. For this reason the crumb slurry was admixed with 650 kgs of water of 85° C. to a dry solids content of 43%. The spray drying was formed in the same spray drier and in the same manner as mentioned in Example 1. The product obtained was powderous, its colour brown, it had a good taste and was extremely well suited for the preparation of confectionary products. It was also very well usable as a cheap alternative to cocoa raw materials which this product thus could completely or partly replace. The product was suitable for couverture uses and for the preparation of fillings for wafers and similar products. The product had the following composition:

|  | % by weight |
|---|---|
| Dry solids | 97.2 |
| Protein | 18.1 |
| Fat | 7.8 |
| Ash content | 5.5 |
| Carbohydrates whereof | 68.6 |
| saccharose | 22 |
| glucose | 6 |
| lactose | 26.3 |
| other (mostly high molecular sugars) | 16.3 |

100 kgs of couverture were prepared in which 60% of the cocoa constituents were replaced with the crumb according to this example. The product obtained was completely comparable to a conventional product. For the preparation of the couverture 40 kgs of powdered sugar were used and 18 kgs of crumb, 8 kgs of cocoa powder and 12 kgs of vegetable fat, which ingredients were mixed in a mixer to a homogeneous structure, whereupon the mass was coarsely rolled and finely rolled to a particle size lesser than 15 m, whereupon it was conched after the addition of further 22 kgs of vegetable fat.

The product was compared by a test panel with conventional so-called dark couverture and the experiment showed that the product prepared with the crumb according to the example was directly comparable to and in some respects better than the conventionally prepared couverture.

A filling for wafers and similar products was prepared from the product according to this example, which filling had the following composition: 31 kgs of powdered sugar, 30 kgs of crumb, 12 kgs of peanut butter with the melting point 32° C. The components were mixed to a homogeneous mass and after coarse rolling and fine rolling further 25 kgs of peanut fat were added in a conventional conch. The product was flavoured with about 2% of flavouring substances (fruit, coffee, cocoa, etc.).

EXAMPLE 3

The experiment in Example 1 was repeated, viz. the preparation of milk crumb, except that flow f4 was increased with 60 gs of phenyl alanin (0.006%) and 500 gs of valin (0.05%) dissolved in 5 liters of water. The so obtained flow F1 was fed into the Contherm heat-exchanger for performing the partial Maillard reaction. The slurry was heated to 110° C. with a holding time of 5 minutes, whereupon the slurry was cooled to 85° C. After the cooling the crumb slurry was diluted with 400 kgs of water before it was admixed with 220 kgs of flow F2 (consisting of 215 kgs of butter oil and 5 kgs of glyceryl monostearate 90 at the temperature 75° C.). The complete flow F=F1+F2 was transferred via a balance vessel with the volume 150 liters to a one-step homogenizer and was treated at 180 kp/cm$^2$. The crumb slurry was then ready for spray drying which was performed as described in Example 1.

The product obtained was extremely tasty and in comparison with the product according to Example 1 more strongly brown-coloured and had a more distinguished toffee taste. It was especially suitable for the preparation of milk chocolate and as a chocolate mass for candies. The composition of the product corresponded with that according to Example 1.

Crumb prepared according to the invention is very suitable for the preparation of so-called instant drinks, viz. products in the powderous form which are dissolved in cold or hot milk or water for obtaining a nutritionally correct and tasty drink. For this purpose the crumb is suitably prepared without agglomeration and with a moisture content which is 1–1.5% higher than would be the case if the crumb would be used for chocolate manufacturing. For manufacturing of the different types of instant drinks the crumb is dry-blended with in such products common components such as finely ground sugar, dextromaltose, milk powder, malt extract, cocoa powder and different flavouring components such as vanilla, fruit powders, etc. Further, suitable types and amounts of vitamins and mineral salts can be added as desired. The mixture of the components is remoistened and "instantized" in any of the conventional ways.

EXAMPLE 4

A drink product in the powder form, intended to be dissolved in hot or cold low-fat milk, is prepared according to the following composition:

| | |
|---|---|
| Crumb according to Example 1 | 40% |
| Dextromaltose | 57% |
| Malt extract | 3% |

The components are dry-mixed and instantized batch-wise in an instantizer of the type "Aromatic". 100 kgs of a mixture with a composition given above were weighed into the agglomeration chamber of an instantizer device. Pressurized, heated air in the calorifer of the agglomerator at a temperature of 50° C. was introduced through the perforated bottom of the chamber for obtaining an optimal agglomeration by fluidation. The well-fluidized batch was moistened with an emulsion of lecithin in water (temperature 50° C.), which was introduced into the chamber in the form of a finely divided mist which was formed with the aid of a suitable pump and nozzle. A satisfactory agglomeration of the batch was obtained by the addition of 15 kgs of an emulsion of lecithin in water consisting of 14 kgs of water (temperature 55° C.) and 1 kg of lecithin.

The agglomerated batch was dried with hot air with a temperature of 72° C. to a final moisture content of 3%, whereupon it was cooled with cold air (temperature about 10° C.).

The product obtained was pourable, immediately soluble in hot or cold aqueous media and excellently suitable for adding to milk so as to obtain a tasty drink. Since the product did not contain natural cocoa it was especially suitable for small children and generally for people who are allergic to cocoa and products containing cocoa.

The data for the product were as follows:

| | % by weight |
|---|---|
| Dry solids content | 97 |
| Protein content | 8 |
| Fat content | 8 |
| Ash content | 5 |
| Carbohydrates | 76 |
| whereof | |
| saccharose | 8 |

F

In a three-step eva) weraporated to a dry solids content of 42% by weight. This concentrate which weighed 520 kgs was used as the flow f1 (temperature about 50° C.) and was fed into a jacketed slurry tank with the volume 4,000 liters and which was provided with an effective stirrer. In another vessel provided with a stirrer 345 kgs of water were introduced at a temperature of 95° C. In the water 980 kgs of partially refined beet sugar were dissolved and 1,010 kgs of 80% glucose solution were added in portions.

The solution was heated to 78° C. by recirculation through a scraped surface heat-exchanger. The smooth solution of sugar and glucose (2,335 kgs) with a dry solids content of 80% by weight was metered into the milk concentrate in the slurry tank as the flow f2.

The first flow F1 was formed by f1+f2=2,855 kgs and it had a dry solids content of 70% by weight and a temperature of 72° C. In a third vessel with the volume 1,000 liters 350 kgs of hardened rape seed fat were heated as the flow f5 to which 10 kgs of tastless soya lecithin and 6 kgs of glycerol monostearate were added, i.e. together 16 kgs of emulsifier as the flow f5. The second flow F2 thus consisted of f5+f6=366 kgs at a temperature of 68° C. The hot flows F1 and F2 were metered into a two-step pressure homogenizer. The flow F=F1+F2=3,225 kgs had a temperature of 71° C. and was homogenized at 90 kp/cm$^2$ and 60 kp/cm$^2$ in the second homogenizing step. After homogenization the product was a stable emulsion with an average fat particle size of 2.5–3 μm. After homogenization the emulsion was cooled in an ice-water-cooled scraped surface heat-exchanger to 12° C.

The finished product had a dry solids content of 73.7% by weight. It was white, smooth, tasty and extremely well suitable for continuous toffee manufacturing. The product had the following composition:

| | % by weight |
|---|---|
| Dry solids content | 73.7 |

|  | % by weight |
|---|---|
| Protein content | 3.3 |
|  | (calculated on the dry solids) |
| Fat | 15 |
|  | (calculated on the dry solids) |
| Ash content | 2.6 |
|  | (calculated on the dry solids) |
| Carbohydrates | 29.1 |
| whereof |  |
| saccharose | 40.3 |
| lactose | 4.8 |
| hexoses and other | 34 |

The product according to this example was used for continuous toffee manufacturing in an apparatus consisting of the following devices: (1) A scraped surface heat exchanger ("Contherm CHTH") with a counter-pressure valve. In this the emulsion was heated to 110° C. (2) A holding cell in which the slurry temperature was maintained at 110° C. for 6 minutes. After the holding cell the brown-coloured toffee slurry had the characteristic well-known toffee taste. (3) Final evaporator ("Convap", Alfa-Laval). (4) A scraped surface heat-exchanger as a cooling step for cooling of the finished toffee mass to a temperature of 60°-65° C. At this temperature the toffee slurry could directly be fed to a so-called toffee extruder which is used for manufacturing toffee bits.

EXAMPLE 6

A mixture of 1,667 kgs of skimmed milk (dry solids content 8.9%) and 3,133 kgs of whey solution (dry solids content 6.9%) were fed into a three-step evaporator and treated to a dry solids content of 42%. This concentrate which weighed 867 kgs was used as flow f1 (temperature about 50° C.) and fed into the slurry tank. Sugar/glucose solution was prepared in the same manner as in Example 5 with the following modifications: In 210 kgs of water at 95° C. were dissolved 830 kgs of partially refined beet sugar and 1,000 kgs of 80% glucose. The smooth solution of sugar and glucose which weighed 2,040 kgs and had a dry solids content of about 80% and a temperature of 80° C. was fed into the slurry tank as the flow f2. The first flow F1 thus consisted of f1+f2 and weighed 2,907 kgs and had a dry solids content of 69% by weight. The flow F2 was prepared in a similar manner and in the same amount ratios as the flow F2 in Example 5. The complete flow F=F1+F2 weighed 3,273 kgs.

The other steps such as homogenization, cooling and packaging were made in the same manner as in Example 5. The finished product was white and tasty and equally well suitable as the product according to Example 5 for continuous toffee manufacturing. The product had the following composition:

|  | % by weight |
|---|---|
| Dry solids content | 70.4 |
| Protein content | 3.7 |
|  | (calculated on the dry solids content) |
| Fat | 15 |
|  | (calculated on the dry solids content) |
| Ash content | 2.6 |
|  | (calculated on the dry solids content) |
| Carbohydrates | 80.7 |
|  | (calculated on the dry solids content) |
| whereof |  |
| saccharose | 35 |
| lactose | 11.6 |
| hexoses, etc. | 34.1 |

I claim:

1. A process for manufacturing crumb products, which comprises preparing a first raw material flow F1 containing component f1 and one or more flows f2-f4 wherein f1 contains liquid milk or milk products selected from the group consisting of completely or partly defatted fresh milk, defatted or whole condensed milk, whey, completely or partly desalted whey, butter milk, casein or caseinate, whey protein concentrate and combinations thereof, having a dry solids content of 20-27% by weight, suitably at a temperature of about 50° C.;

f2 contains sugar raw materials in the form of tetroses, pentoses, hexoses selected from the group consisting of glucose, fructose, and galactose, sugar alcohols exemplified by sorbitol, disaccharides selected from the group consisting of lactose, maltose, and dextromaltose, partially hydrolyzed starch, syrup products, xylitol or different combinations thereof, suitably in an aqueous solution;

f3 contains dry protein raw materials selected from the group consisting of vegetable protein, dry milk solids, whey powder, butter milk powder, which suitably are admixed with water and treated in in a colloid mill, having the same dry solids contents as stated for f1;

f4 contains one or more amino acids, which may be in combination with one or more reducing sugars, suitably in an aqueous solution;

and a second flow F2 consisting of flow f5 and may contain flow f6, of which f5 contains fatty components selected from the group consisting of cream, suitably with a fat content of 12-35% by weight, butter, butter oil, other vegetable and/or animal fat products or fat-containing products and mixtures thereof;

f6 consists of an emulsifier for the fat phase, which promotes the formation of emulsions of the type oil-in-water, exemplified by glyceryl monostearate;

and wherein the flow F1 having a dry solids content of 20-70% by weight and a pH in the range 4-8 is heat-treated at a temperature of 100°-130° C. during a period of time of about 7-2 minutes for performing a Maillard reaction, and subsequently is cooled to a temperature of about 80°-95° C.; whereupon the flows F1 at the said temperature and F2 at a temperature of about 65°-75° C. are metered into an emulsifying vessel to the formation of an emulsion of F2 in F1, which emulsion after an adjustment of the water content, if required, is submitted to a homogenizing treatment in a homogenizer, whereupon the crumb emulsion formed is used directly.

2. A process according to claim 1, wherein the lactose in the milk products in flows f1 and/or f3 are hydrolyzed to glucose and galactose.

3. A process according to claim 1, wherein flow f3 completely or partly replaces the flow f1 or that the flow f1 completely or partly replaces the flow f3.

4. A process according to claim 1, wherein the Maillard reaction in the flow F1 is performed in a heat-exchanger of the backpressure type.

5. A process according to claim 1, wherein the drying of the homogenized emulsion of flows F1 and F2 is performed in a spray drier.

6. A process according to claim 5, wherein the fine components obtained during the sieving are recycled to the top of the spray drier.

7. A process according to claim 5, wherein a coarse fraction obtained by the sieving is ground and sieved for obtaining a product fraction and fines which are recycled to the top of the spray drier.

8. A process according to claim 1, wherein the dry solids content of f1 is 30-45% by weight.

9. A process according to claim 1, wherein the pH range of F1 is 6.5-7.5.

10. A process according to claim 1, wherein the formed crumb emulsion is dried to a powder and which may be further heat-treated to reduce to water content to about 1.5-6% by weight, and sieving to obtain a desired fraction.

11. A process according to claim 10, wherein the water content after drying is 2-3.5% by weight.

12. A process according to claim 2, wherein the hydrolysis is effected by enzymatic treatment.

* * * * *